(12) United States Patent
Suematsu et al.

(10) Patent No.: US 10,379,299 B2
(45) Date of Patent: Aug. 13, 2019

(54) OPTICAL FIBER ARRAY

(71) Applicant: FURUKAWA ELECTRIC CO., LTD., Tokyo (JP)

(72) Inventors: Katsuki Suematsu, Tokyo (JP); Mitsuhiro Iwaya, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/139,731

(22) Filed: Sep. 24, 2018

(65) Prior Publication Data

US 2019/0033537 A1  Jan. 31, 2019

Related U.S. Application Data

(63) Continuation of application No. PCT/JP2017/012885, filed on Mar. 29, 2017.

(30) Foreign Application Priority Data

Mar. 31, 2016  (JP) .................... 2016-071908

(51) Int. Cl.
*G02B 6/40* (2006.01)
*G02B 6/38* (2006.01)
(Continued)

(52) U.S. Cl.
CPC .............. *G02B 6/40* (2013.01); *G02B 6/08* (2013.01); *G02B 6/24* (2013.01); *G02B 6/3829* (2013.01);
(Continued)

(58) Field of Classification Search
CPC ................................... G02B 6/3859
See application file for complete search history.

(56) References Cited

U.S. PATENT DOCUMENTS 8,235,604 B2 * 8/2012 Suzuki ................. G02B 6/4249
385/14
10,036,856 B2 * 7/2018 Suematsu ............ G02B 6/3885
(Continued)

FOREIGN PATENT DOCUMENTS

JP  01-227106  9/1989
JP  06-118263  4/1994
(Continued)

OTHER PUBLICATIONS

International Search Report dated Jun. 20, 2017 in PCT/JP2017/012885 filed Mar. 29, 2017 (with English Translation).
(Continued)

*Primary Examiner* — Rhonda S Peace
(74) *Attorney, Agent, or Firm* — Oblon, McClelland, Maier & Neustadt, L.L.P.

(57) ABSTRACT

An optical fiber array according to one embodiment includes: an optical fiber; and a support member that supports the optical fiber. The support member comprises a mixture material of a base material and a solid material made of a material different from the base material, in which the base material contains at least either of thermoplastic resin or thermosetting resin, a light transmittance for at least one wavelength within a UV light wavelength range greater than or equal to 300 nm and less than or equal to 450 nm with respect to the support member having a thickness of 3 mm is 30% or greater, and an average light transmittance for a wavelength within a visible light wavelength range greater than or equal to 380 nm and less than or equal to 780 nm with respect to the support member having a thickness of 3 mm is 70% or less.

7 Claims, 8 Drawing Sheets

(51) Int. Cl.
  *G02B 6/24* (2006.01)
  *G02B 6/08* (2006.01)
  *G02B 6/42* (2006.01)
  *G02B 6/44* (2006.01)
(52) U.S. Cl.
  CPC ......... *G02B 6/3865* (2013.01); *G02B 6/3881* (2013.01); *G02B 6/42* (2013.01); *G02B 6/4249* (2013.01); *G02B 6/44* (2013.01)

(56) References Cited

U.S. PATENT DOCUMENTS

| | | | |
|---|---|---|---|
| 2003/0142922 | A1 | 7/2003 | Dallas et al. |
| 2009/0010603 | A1* | 1/2009 | Sugioka .................. C08K 3/22 385/123 |
| 2010/0247042 | A1 | 9/2010 | Suzuki et al. |
| 2016/0291261 | A1* | 10/2016 | Izumi .................. G02B 6/3839 |
| 2017/0123164 | A1 | 5/2017 | Suematsu et al. |
| 2018/0156987 | A1* | 6/2018 | Nakanishi .............. G02B 6/036 |
| 2018/0292621 | A1* | 10/2018 | Nanjo .................. G01S 7/4818 |
| 2019/0033537 | A1* | 1/2019 | Suematsu ................ G02B 6/40 |

FOREIGN PATENT DOCUMENTS

| | | |
|---|---|---|
| JP | 07-013033 | 1/1995 |
| JP | 10-231131 | 9/1998 |
| JP | 2010-237267 | 10/2010 |
| JP | 2016-133518 | 7/2016 |
| WO | WO 2016/006713 | 1/2016 |
| WO | WO 2016/114335 A1 | 7/2016 |

OTHER PUBLICATIONS

Written Opinion dated Jun. 20, 2017 in PCT/JP2017/012885 filed Mar. 29, 2017.

* cited by examiner

OPTICAL FIBER ARRAY

CROSS-REFERENCE TO RELATED APPLICATIONS

This application is a continuation application of International Application No. PCT/JP2017/012885, filed Mar. 29, 2017, which claims the benefit of Japanese Patent Application No. 2016-071908, filed Mar. 31, 2016. The contents of the aforementioned applications are incorporated herein by reference in their entireties.

TECHNICAL FIELD

The present invention relates to an optical fiber array that aligns and fixes optical fibers.

BACKGROUND ART

In order to connect a plurality of optical fibers to an optical device (an optical oscillator, an optical amplifier, an optical switch, or the like), an optical fiber array that aligns and fixes the plurality of optical fibers is used. With an optical fiber array holding a plurality of optical fibers being fixed to an optical device, the plurality of optical fibers can be connected to the optical device all at once. This eliminates labor for connecting optical fibers to an optical device one by one and can facilitate connecting work.

Patent Literature 1 discloses an optical fiber array formed by arranging optical fibers in V-shaped grooves provided in substrates and interposing the optical fibers between the two substrates. Patent Literature 2 discloses an optical fiber array formed by arranging optical fibers in a mold, flowing an ultraviolet (UV) curable resin into the mold, curing the UV curable resin, and then removing the mold. The optical fiber array disclosed in Patent Literatures 1 and 2 may accurately align and fix a plurality of optical fibers.

CITATION LIST

Patent Literature

Patent Literature 1: Japanese Patent Application Laid-Open No. H6-118263
Patent Literature 2: Japanese Patent Application Laid-Open No. H7-13033

SUMMARY OF INVENTION

In connecting an optical fiber array to an optical device, a UV curable adhesive agent may be used for fixation. Since the UV curable adhesive agent is cured by being exposed in UV light, a sufficient UV light needs to reach a bonding area in fixation.

The optical fiber array disclosed in Patent Literature 1 may be formed by using a glass (quartz glass or the like), for example. The optical fiber array disclosed in Patent Literature 2 may be formed by using a transparent UV curable resin, for example. The use of these materials allows a UV light to sufficiently transmit to a UV curable adhesive agent and fix the optical fiber array to an optical device.

When a glass as a material of an optical fiber array is used as disclosed in Patent Literature 1, however, there are problems of a low mass-productivity due to a long lead time of grinding for finishing the fiber surface and a high manufacturing cost due to wear of a grinding tool. Further, a glass has low shape-flexibility and is likely to be damaged by impact.

Further, when arranging optical fibers in a mold, flowing a UV curable resin into the mold, curing the UV curable resin, and then removing the mold to form an optical fiber array as illustrated in Patent Literature 2, there is a problem of low mass-productivity.

The present invention has been made in view of the problems described above and intends to provide an optical fiber array that can be fabricated easily in a short time and is superior in mass-productivity.

One aspect of the present invention is an optical fiber array including: an optical fiber; and a support member that supports the optical fiber. The support member comprises a mixture material of a base material and a solid material made of a material different from the base material, in which the base material contains at least either of thermoplastic resin or thermosetting resin, and a light transmittance for at least one wavelength within a UV light wavelength range greater than or equal to 300 nm and less than or equal to 450 nm with respect to the support member having a thickness of 3 mm is 30% or greater, and an average light transmittance for a wavelength within a visible light wavelength range greater than or equal to 380 nm and less than or equal to 780 nm with respect to the support member having a thickness of 3 mm is 70% or less.

The optical fiber array according to the present invention has an advantage that an optical fiber array that can be fabricated easily in a short time and is superior in mass-productivity can be realized.

DESCRIPTION OF EMBODIMENT

Figure 1:
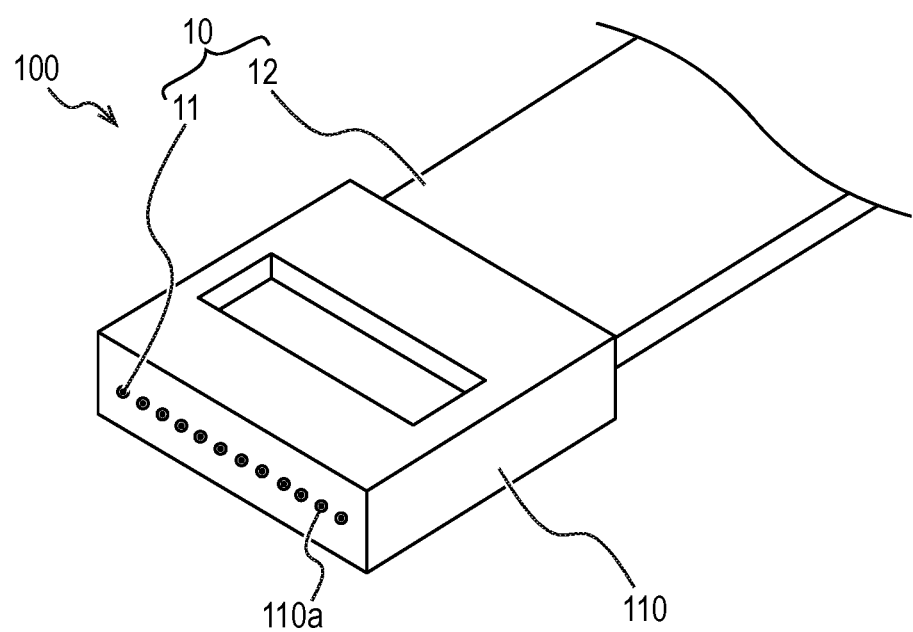
FIG. 1 is a perspective view of an optical fiber array according to an embodiment.

While an embodiment of the present invention will be described below with reference to the drawings, the present invention is not limited to the present embodiment. Note that, in the drawings illustrated below, the same reference numerals are provided to those having the same function, and the duplicated description thereof may be omitted.

Embodiment

FIG. 1 is a perspective view of an optical fiber array 100 according to the present embodiment. The optical fiber array 100 aligns and fixes optical fibers 11 included in the optical fiber tape 10. The optical fiber tape 10 has the optical fibers 11 and a coating layer 12 that integrally covers the optical fibers 11. The coating layer 12 may be formed of a single layer, or may be formed of multiple layers whose properties such as an elastic modulus are different from each other. Further, a coating layer that covers each of the optical fibers 11 may be provided inside.

The optical fiber 11 is a linear glass optical fiber and has a core in the center and a clad covering the circumference of the core. Two or more any optical fibers 11 are provided. A predetermined length from the end of the optical fiber 11 is not covered by the coating layer 12 (or the coating layer 12 is removed), and a glass optical fiber is exposed.

The coating layer 12 is formed by curing a UV curable resin. As a UV curable resin used for the coating layer 12, a mixture in which a photo-initiator, a diluted monomer, and other additive agents are mixed to an oligomer such as urethane acrylate, epoxy acrylate, polyester acrylate, or the like, for example, may be used.

The optical fiber array 100 has a support member 110 (also referred to as a ferule) that supports the tip of the optical fiber 11. The support member 110 is formed by using a thermoplastic resin or a thermosetting resin. The support member 110 has a plurality of through holes 110a, the number and the size of which can accommodate the optical fibers 11 one by one, and positions and fixes the optical fibers 11 passed through the plurality of through holes 110a. That is, the plurality of through holes 110a function as a positioning mechanism of the optical fibers 11. While formed of a single member in FIG. 1, the support member 110 may be formed in combination of a plurality of members. In this case, the support member 110 has a plurality of grooves instead of the plurality of through holes 110a as a positioning mechanism, and the optical fiber 11 may be fixed by pressing the optical fibers 11 placed on the plurality of grooves against a plurality of members.

Figure 2:
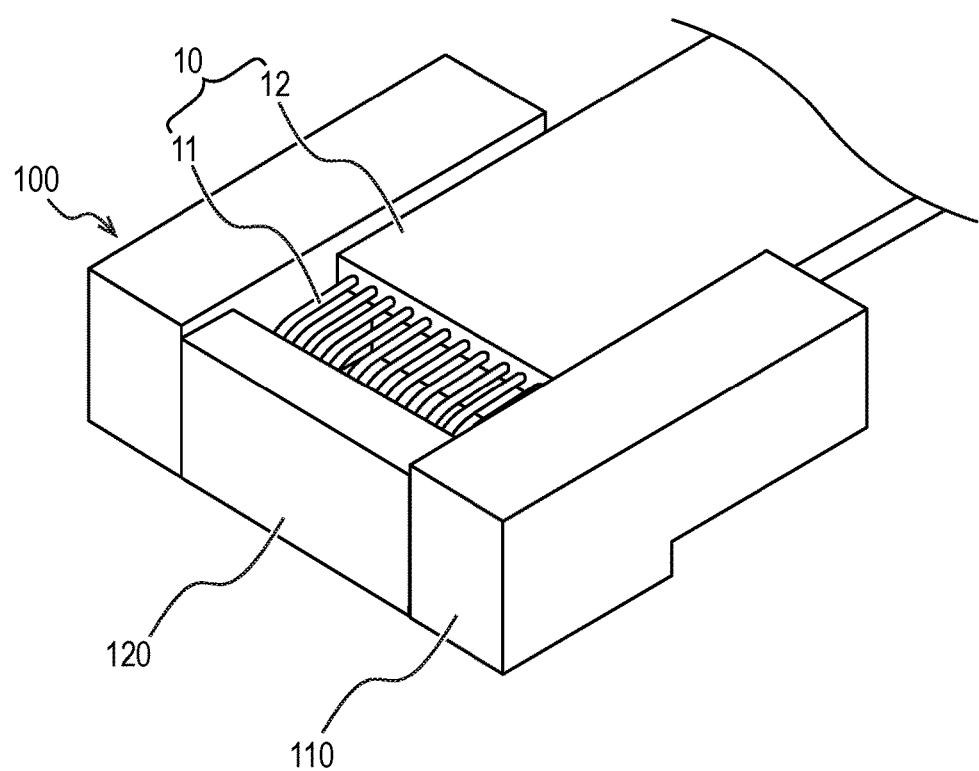
FIG. 2 is a perspective view of the optical fiber array according to the embodiment.
Figure 3:
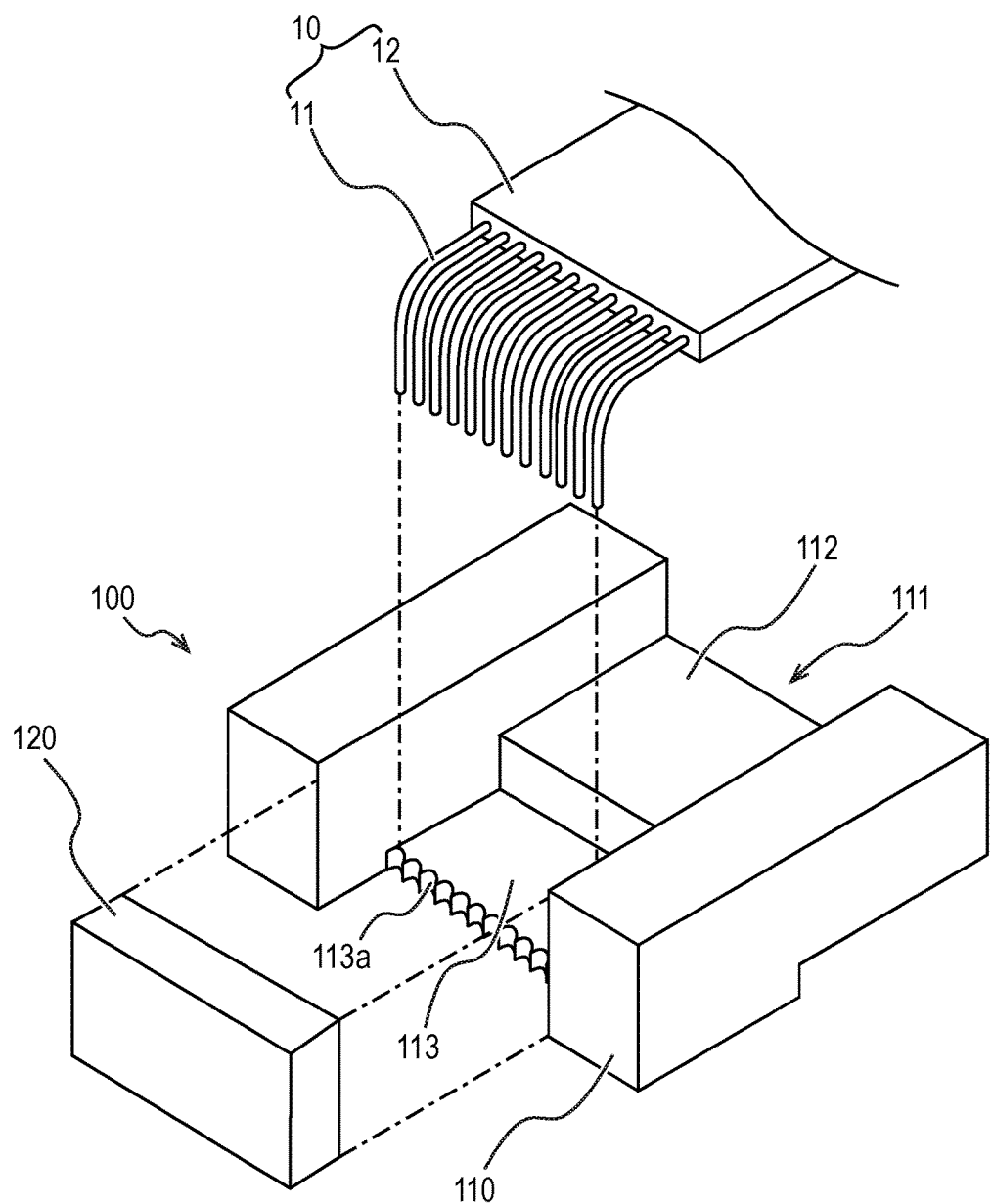
FIG. 3 is an exploded perspective view of the optical fiber array according to the embodiment.

While a linear glass optical fiber is used as the optical fiber 11 in FIG. 1, since there is a spatial limitation above an optical device that outputs and inputs a light in vertical direction (perpendicular direction of the substrate surface) from the substrate, it is effective to use a bent glass optical fiber as the optical fiber 11 when the fiber is to be pulled out in the lateral direction (horizontal direction of the substrate surface). FIG. 2 is a perspective view of another optical fiber array 100 according to the present embodiment. FIG. 3 is an exploded perspective view of the optical fiber array 100 of FIG. 2.

In the optical fiber array 100 of FIG. 2 and FIG. 3, the basic configuration of the optical fiber tape 10 including the optical fibers 11 and the coating layer 12 is the same as that of the optical fiber array 100 of FIG. 1. The difference from the optical fiber array 100 of FIG. 1 is that a region of a predetermined length from the end of the optical fiber 11 is gradually bent. The bend radius of the optical fiber 11 is 5 mm or less and preferably 3 mm or less, for example. Although a smaller bend radius is preferable in terms of reduction in size, an excessively smaller bend radius is likely to cause breakage and causes a problem of increase in propagation loss of the optical fiber, and therefore the bend radius is preferably 0.5 mm or greater. Further, it is preferable that high strength treatment such as removal of defects be applied to the bent part of the optical fiber. The bending angle of the bending part is greater than or equal to 85 degrees and less than or equal to 150 degrees, for example. This can reduce the height of the bent optical fiber, and realize a reduction in size of the optical fiber array 100.

The optical fiber array 100 of FIG. 2 and FIG. 3 has the support member 110 that supports the tip of the optical fiber 11 and a plate member 120 that covers the front face of the support member 110. The support member 110 and the plate member 120 are formed by using a thermoplastic resin or a thermosetting resin. Further, a resin part 130 is provided so as to cover the optical fibers 11 interposed between the support member 110 and the plate member 120, and thereby the optical fiber tape is adhered and fixed to the support member 110 and the plate member 120. Note that the resin part 130 is not illustrated for better visibility in FIG. 2 and FIG. 3.

A groove part 111 is formed in the axial direction of the optical fiber tape 10 in the upper face of the support member 110, the optical fiber tape 10 is accommodated within the groove part 111. Specifically, the groove part 111 has a shallow groove part 112 and a deep groove part 113, the coating layer 12 is supported on the shallow groove part 112, and the optical fibers 11 are supported on the deep groove part 113. On the entire surface of the groove part 113, a plurality of grooves 113a are formed, the number and the size of which can accommodate the optical fibers 11 one by one. Further, each of the grooves 113a can support the end of the optical fiber 11.

The support member 110 is a member made of a cured (solid) thermoplastic resin or thermosetting resin. The plate member 120 is provided so as to press the optical fibers 11 arranged in the grooves 113a against the support member 110. Thereby, the optical fiber tape 10 is positioned. In this way, the grooves 113a and the plate member 120 forms a plurality of positioning mechanisms that position the end of the plurality of optical fibers 11. The plate member 120 is a plate-shaped member made of a cured (solid) thermoplastic resin or thermosetting resin.

The resin part 130 is provided to cover the optical fibers 11 interposed between the support member 110 and the plate member 120. The resin part 130 may be formed by filling an uncured (liquid) adhesive agent in the space between the support member 110 and the plate member 120 and curing the adhesive agent after assembly of the optical fiber tape, the support member 110, and the plate member 120. The adhesive agent is formed of a material through which a UV light transmits after cured. As an adhesive agent used in the resin part 130, it is desirable to use a UV curable resin having a short curing time in order to reduce the lead time.

As a UV curable resin used for the resin part 130, for example, one in which a light transmittance after cured is greater than or equal to 30% for at least one wavelength within a UV light wavelength range greater than or equal to 300 nm and less than or equal to 450 nm is used. It is preferable that the at least one wavelength at which the light transmittance is 30% or greater correspond to the wavelength at which the light transmittance of the support member 110 described later is 30% or greater.

Note that the light transmittance in the present specification means a transmittance for a sample having a thickness of 3 mm. As a UV curable resin used for the resin part 130, a mixture in which a photo-initiator which has an absorption region in the wavelength described above, a diluted monomer, and other additive agents are mixed to an oligomer such as urethane acrylate, epoxy acrylate, polyester acrylate, or the like, for example, may be used.

The optical fiber tape 10 is fixed to the support member 110 and the plate member 120 such that the end of the optical fiber 11 is exposed outside. The externally exposed end of the optical fiber 11 may be optically connected to an optical device.

Figure 4:
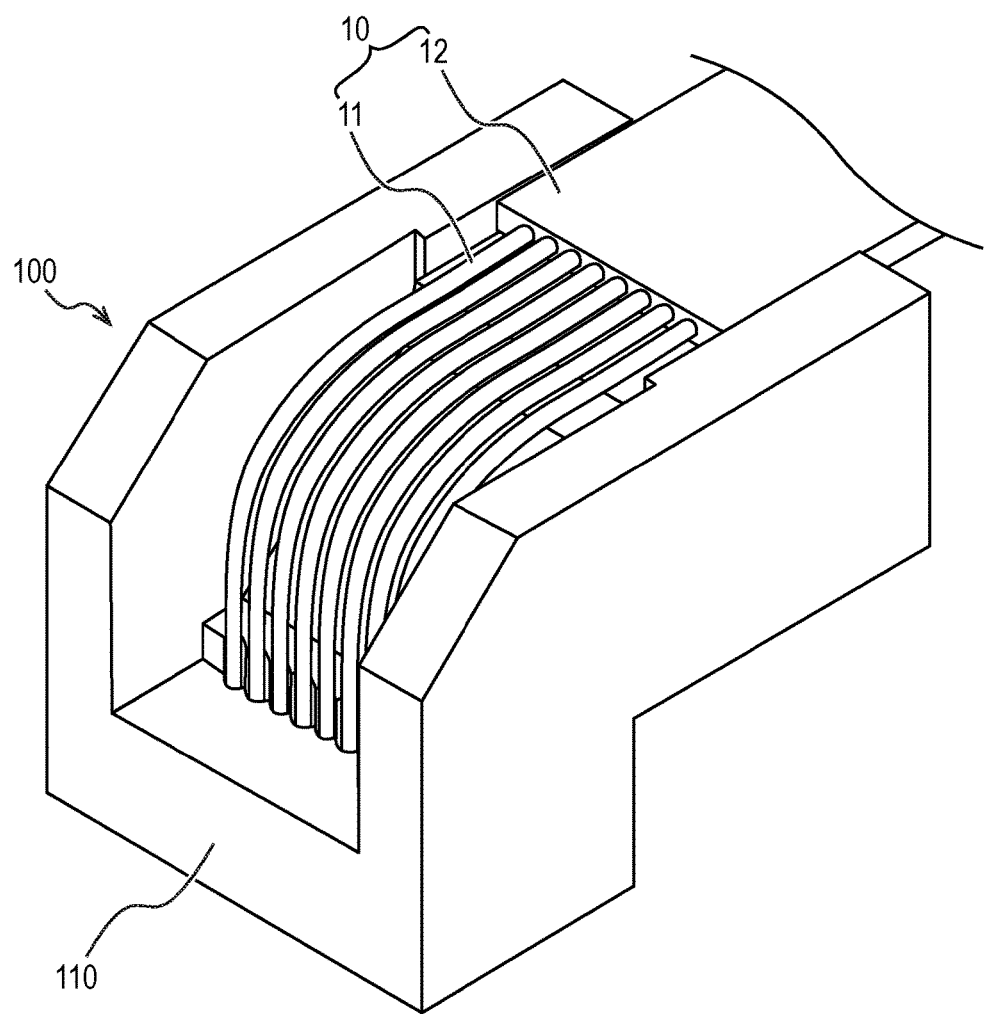
FIG. 4 is a perspective view of the optical fiber array according to the embodiment.
Figure 5:
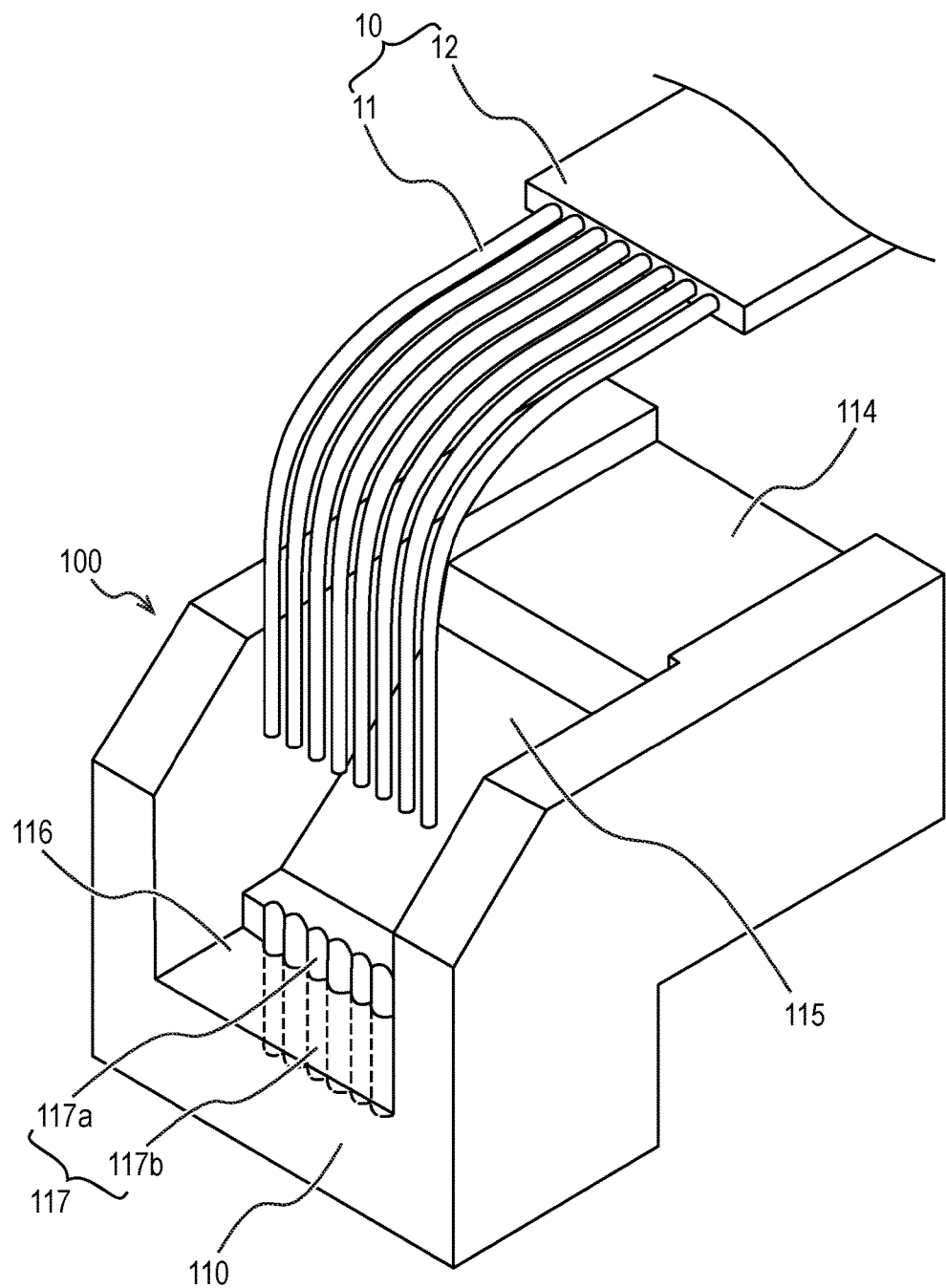
FIG. 5 is an exploded perspective view of the optical fiber array according to the embodiment.

FIG. 4 is a perspective view of yet another optical fiber array 100 according to the present embodiment. FIG. 5 is an exploded perspective view of the optical fiber array 100 of FIG. 4. The optical fiber array 100 of the FIG. 4 and FIG. 5 is similar to the optical fiber array 100 of FIG. and FIG. 3 but has no plate member 120, which makes a difference in the configuration of the support member 110. As illustrated in FIG. 4 and FIG. 5, the optical fiber array 100 has the optical fiber tape 10 including a plurality of optical fibers, a support member 110 having a plurality of positioning mechanisms 117 for aligning the end of the plurality of optical fibers 11, and a resin part 130 filled around the periphery of the optical fiber 11. Note that the resin part 130 is not illustrated in FIG. 4 and FIG. 5 for better visibility.

The support member 110 is an integrally formed member whose cross section has substantially an L-shape. A groove part 114 is formed in the support member 110 along the axis direction of the optical fiber tape 10 of the optical fiber, and the optical fiber tape 10 is accommodated within the groove part 114.

Further, a groove part 115 having a sloped bottom face continuously formed from the groove part 114 is provided in the support member 110. The bent parts of the optical fibers 11 are accommodated in the groove part 115. Further, a horizontal bottom part 116 formed to be continuous to the groove part 115 is further provided, and a plurality of grooves 117a are provided in the bottom part 116. The plurality of grooves 117a are formed such that the number and the size thereof can accommodate the optical fibers 11 one by one. Further, a plurality of through holes 117b corresponding to the plurality of grooves 117a are formed in the support member 110, and each end of each optical fiber is inserted in each of the plurality of through holes 117b. Note that, although not illustrated, in the through hole 117b, the diameter on the side where the optical fiber 11 is inserted is larger than the diameter on the side where the optical fiber 11 exits, and the diameter on the side where the optical fiber 11 exits is slightly larger than the outer diameter of a glass optical fiber. This enables easier insertion of the optical fiber 11 into the through hole 117b and accurate positioning of the plurality of optical fibers 11 to the support member 110. The plurality of grooves 117a and the plurality of through holes 117b form a positioning mechanism 117. Thereby, the end of each optical fiber 11 is exposed outside and supported in the support member 110, and the plurality of optical fibers 11 are positioned within the support member 110 by the positioning mechanism 117.

The resin part 130 is provided to cover the optical fibers 11 positioned by the support member 110. The resin part 130 may be formed by filling an uncured (liquid) adhesive agent on the upper face of the optical fibers 11 and curing the adhesive agent after positioning the optical fiber tape to the support member 110. The adhesive agent is formed of a material through which a UV light transmits after cured. As an adhesive agent used in the resin part 130, it is desirable to use a UV curable resin in the same manner as the case of FIG. 2 and FIG. 3.

The size of the optical fiber array 100 illustrated in FIG. 4 and FIG. 5 is such that the thickness is 3.5 mm, the width is 3.7 mm, and the length is 6.0 mm, for example. Further, in the optical fiber array 100, the optical fiber 11 is bent with the bent radius R=2.5 mm, for example, and the bent angle is 98 degrees, for example.

Each configuration of the optical fiber arrays 100 illustrated in FIG. 1 to FIG. 5 is an example, and may be properly changed as long as it can align and fix the optical fibers 11.

Figure 6:
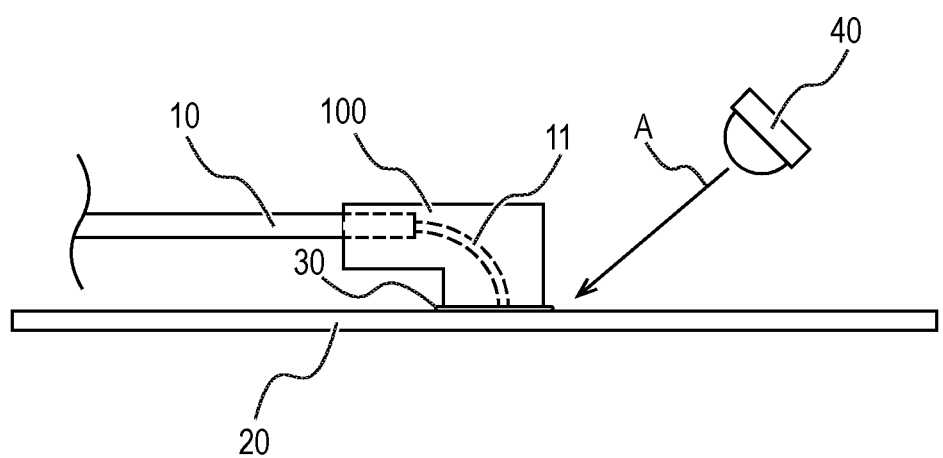
FIG. 6 is a side view of an optical fiber array when fixed to an optical device.

FIG. 6 is a side view of the optical fiber array 100 when fixed to an optical device 20. While FIG. 6 illustrates a case where the bent optical fibers 11 illustrated in FIG. 2 to FIG. 5 are used as an example, the same applies to the case where the linear optical fibers 11 illustrated in FIG. 1 are used. The optical device 20 may be an optical oscillator, an optical amplifier, an optical switch, or the like, for example, and has an optical waveguide, a semiconductor element, an electric circuit, and the like inside or on the surface of a substrate. As a substrate forming the optical device 20, any substrate inside or on the surface of which an optical waveguide can be formed, such as a Si substrate, a quartz substrate, an InP substrate, or the like may be used.

The optical fiber array 100 is fixed to the optical device 20 by using a UV curable adhesive agent 30. The end of the optical fiber 11 is optically connected to an optical waveguide or a semiconductor element included in the optical device 20 with the optical fiber array 100 being fixed to the optical device 20.

The UV curable adhesive agent 30 contains a UV curable resin that is cured by being irradiated with a UV light having at least one wavelength in a range from 300 nm to 450 nm (that is, greater than or equal to 300 nm and less than or equal to 450 nm). As the UV curable adhesive agent 30, a mixture in which a photo-initiator which has an absorption region in the wavelength described above, a diluted monomer, and other additive agents are mixed to an oligomer such as urethane acrylate, epoxy acrylate, polyester acrylate, or the like may be used.

A UV light source 40 is a light source such as a lamp, a light emitting diode (LED), or the like that outputs a UV light having at least one wavelength that can cure the UV curable adhesive agent 30.

Figure 7:
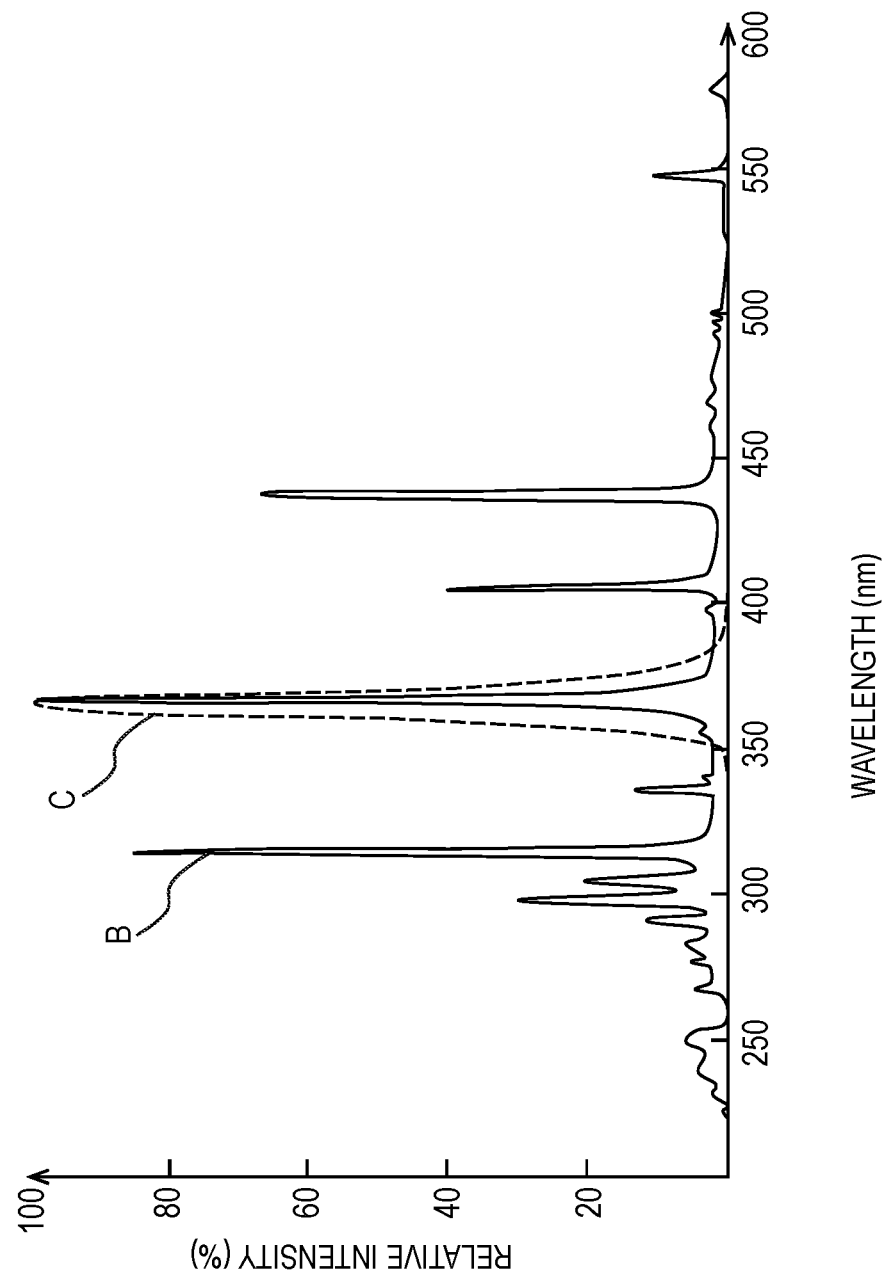
FIG. 7 is a diagram illustrating a graph of a UV light spectral output from an exemplary UV light source.

FIG. 7 is a diagram illustrating a graph of an exemplary spectral of a UV light output from the UV light source 40. In the graph of FIG. 7, the horizontal axis represents the wavelength (nm), and the vertical axis represents the relative intensity (%). The graph of FIG. 7 illustrates a spectral B (solid line) when a UV lamp is used as the UV light source 40 and a spectral C (dashed line) when a UV LED is used as the UV light source 40.

As illustrated in FIG. 7, a UV light output from a UV lamp has a plurality of wavelength peaks within a wavelength range from 300 nm to 450 nm. On the other hand, a UV light output from a UV LED has one wavelength peak within a wavelength range from 300 nm to 450 nm. While FIG. 7 illustrates a case where there is a wavelength peak at 365 nm as an example, the peak wavelength is not limited thereto. The UV curable adhesive agent 30 has been prepared so as to be cured at a wavelength of a UV light output from the UV light source 40.

As illustrated in FIG. 6, the UV curable adhesive agent 30 is applied between a face on which the end of the optical fiber 11 is located on the optical fiber array 100 and the optical device 20 and cured by being irradiated with a UV light A output from the UV light source 40. Thus, when the optical fiber array 100 has a low UV light transmissivity, there is a concern that no sufficient amount of UV light reaches the UV curable resin 30 because the optical fiber array 100 blocks the UV light. As a result, curing of the UV curable adhesive agent 30 becomes insufficient, and the fixing strength of the optical fiber array 100 decreases. This leads to deterioration of characteristics and a reduction in reliability of the optical fiber 11 and the optical device 20.

On the other hand, an excessively increased light transmissivity of the optical fiber array 100 for allowing a UV light to sufficiently transmit causes another problem. For the purpose of inspection of the support member 110 or the like of the optical fiber array 100, it is demanded to accurately measure the position, the size, or the like of the positioning mechanism such as the through holes 110a or 117b or the grooves 113a or 117a of the support member 110 provided for supporting the optical fibers 11. In measuring the position, the size, or the like, the positioning mechanism of the support member 110 is irradiated with a visible light in the longitudinal direction thereof, a shade of the edge formed by the irradiation is detected, and thereby the position, the size, or the like of the positioning mechanism is calculated. Thus, when the visible light transmissivity of the support member 110 is excessively high, since no clear shade is formed, it is difficult to accurately measure the position, the size, or the like of the positioning mechanism.

The support member 110 (including the plate member 120) of the optical fiber array 100 according to the present embodiment has the following configuration for solving the above problem. The support member 110 is formed of a mixture material of a base material and a filler that is a solid material made of a different material from the base material, in which the base material contains at least either of thermoplastic resin or thermosetting resin.

The base material used for the support member 110 contains a thermoplastic resin or a thermosetting resin which transmits a UV light having a wavelength which cures the UV curable adhesive agent 30, that is, at least one wavelength within a range from 300 nm to 450 nm. A thermoplastic resin is a resin that is softened by heating and cured by cooling, and a thermosetting resin is a resin that is cured by heating. As a thermoplastic resin used for the base material, an amorphous resin such as polycarbonate (PC), polyethersulfone (PES), or the like, for example, may be used. Alternatively, as a thermosetting resin used for the base material, a urea formaldehyde resin (UF), a melamine formaldehyde resin (MF), or the like, for example, may be used.

It is desirable that the mean molecular weight (number average molecular weight) of the base material be twenty thousand or more. A use of a base material having such a high molecular weight can improve the strength of the support member 110. Further, a use of a base material having a high molecular weight can suppress extrusion failure and improve manufacturability in pelletizing the mixture of the base material and the filler. However, an excessively large mean molecular weight of the base material causes a problem of loss of fluidity and difficulty in formation. It is therefore preferable that the mean molecular weight of the base material be thirty thousand or less.

The filler used for the support member 110 is a solid material which transmits a UV light having a wavelength which cures the UV curable adhesive agent 30, that is, at least one wavelength within a range from 300 nm to 450 nm. As the filler, a solid material formed by a quartz glass or a quartz crystal being processed in a predetermined shape, for example, may be used. It is desirable that the filler be composed so as to occupy 40% or more in volume of the support member 110 (that is, the mixture material of the base material and the filler) (60% or more in weight of the support member 110 when weight percent is used). With the filler being composed at such a high filling ratio, the linear expansion coefficient of the support member 110 can be reduced to 40 ppm per degree Celsius or less.

The base material and the filler are configured to generate a predetermined difference between the refractive index of the base material and the refractive index of the filler. Adjustment of the refractive index may be performed by a known method, for example, may be performed by adding inorganic particles to the base material or the filler. It is desirable that the difference between the refractive index of the base material and the refractive index of the filler be greater than or equal to 0.01 and less than or equal to 0.03.

By providing a slight difference between the refractive index of the base material and the refractive index of the filler in such a way, it is possible to suppress a visible light transmissivity while ensuring a UV light transmissivity.

Specifically, the visible light transmissivity for accurate size measurement is obtained when an average light transmittance for a wavelength within a visible light wavelength range from 380 nm to 780 nm (that is, greater than or equal to 380 nm and less than or equal to 780 nm) (referred to as visible light transmittance) with respect to the support member 110 (mixture material of the base material and the filler) having a thickness of 3 mm is less than or equal to 70%. At the same time, a UV light transmissivity for causing a sufficient UV light to reach the bonding area of the optical fiber array 100 is obtained when a light transmittance for at least one wavelength within a UV light wavelength range from 300 nm to 450 nm (referred to as UV light transmittance) with respect to the support member 110 (mixture material of the base material and the filler) having a thickness of 3 mm is greater than or equal to 30%.

Figure 8:
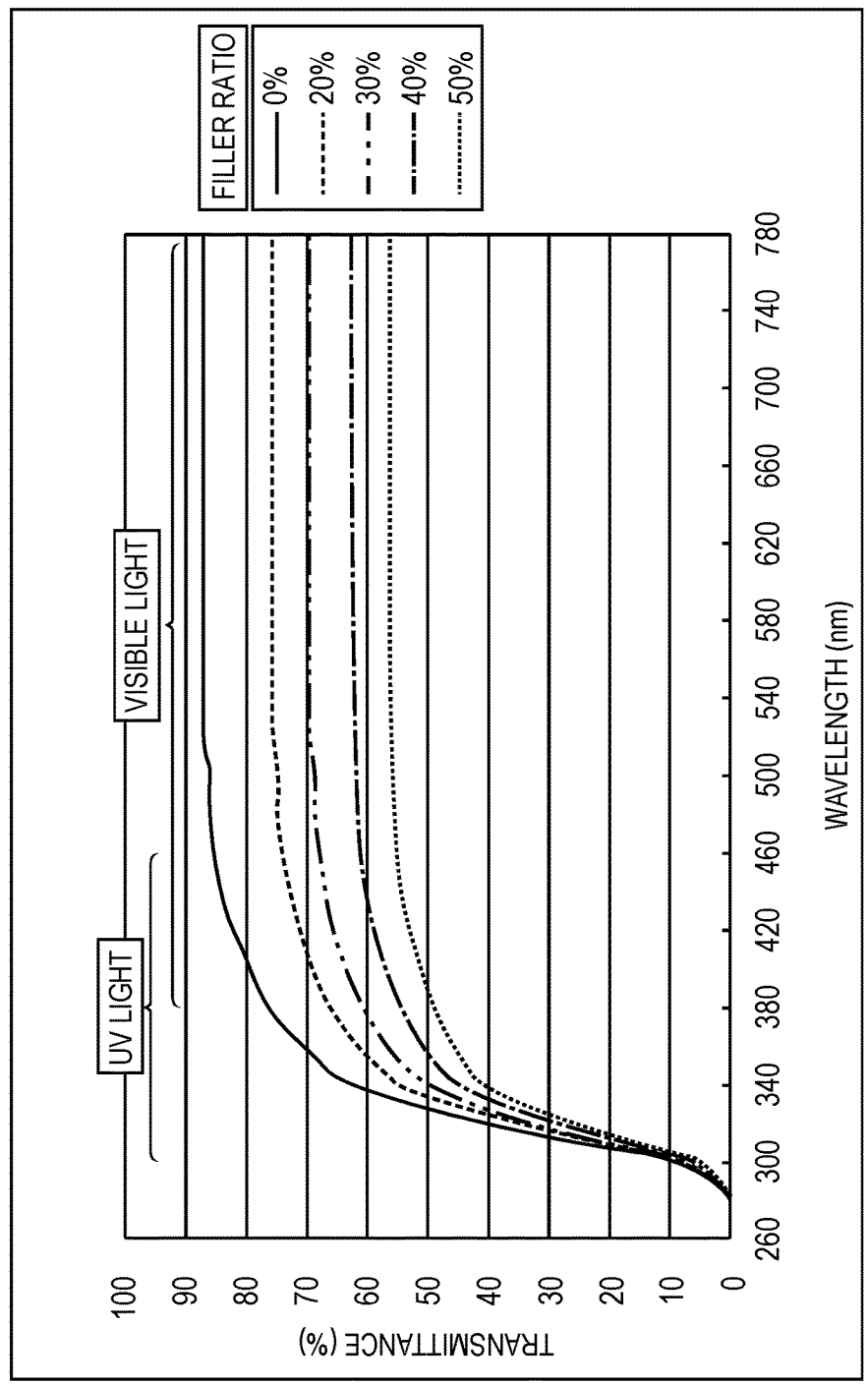
FIG. 8 is a diagram illustrating a graph of a light transmittance in various filler composite ratio.

FIG. 8 is a diagram illustrating a graph of the light transmittance for various filler composite ratio. In FIG. 8, the horizontal axis represents the wavelength (nm), and the vertical axis represents the light transmittance (%). FIG. 8 illustrates a graph for cases where the composite ratio of the filler (the volume percent of the filler to the support member 110) is 0%, 20%, 30%, 40%, and 50%. As illustrated in FIG. 8, within the visible light wavelength range from 380 nm to 780 nm, the visible light transmittance is 70% or less when the filler composite ratio is 30% or greater, and this enables accurate size measurement. Further, within the UV light wavelength range from 300 nm to 450 nm, the UV light transmittance for at least one wavelength is 30% or greater for all the filler composite ratios, and this enables a sufficient UV light to reach the bonding area.

As the filler, a spherical filler made of spherical solid materials or a fiber-crushed filler obtained by crushing fiber solid materials may be used. It is desirable that the average particle diameter of the spherical filler is greater than or equal to 10 μm and less than or equal to 50 μm. When the spherical filler is used, in a process of grinding a surface on the optical fiber array 100 where the end of the optical fiber 11 is located, since a filler removed from the surface due to the grinding is a sphere shape, an advantage of suppressing the end of the optical fiber 11 from being damaged is obtained. It is desirable for the fiber-crushed filler to have a fiber diameter of 50 μm or less and an average fiber length of 100 μm or less. Since the fiber-crushed filler allows for a higher anchor effect that connects the base materials due to the shape of the crushed fibers, an advantage of improving the strength of the support member 110 is obtained. Further, in a process of pelletizing the mixture of the base material and the filler, an advantage of stabilizing extrusion and improving manufacturability is obtained by a high anchor effect.

As described above, the support member 110 according to the present embodiment restricts the transmissivity of visible light while ensuring the transmissivity of UV light by providing a slight difference between the refractive index of the base material and the refractive index of the filler. Thus, in fixing the optical fiber array 100 to the optical device 20, it is possible to cause a sufficient UV light to transmit to the UV curable adhesive agent and easily fix it in a short time. At the same time, the restricted transmissivity of visible light allows the shade of the edge to be formed during irradiation of the visible light, and the size of the support member 110 can be accurately measured. Furthermore, since the filler is composed and filled in the support member 110 at a high ratio, this results in a lower linear expansion coefficient than that of a thermoplastic resin or a thermosetting resin, and improves the temperature stability when the optical device 20 having a similar low linear expansion coefficient is connected.

Furthermore, with one in which a light transmittance for at least one wavelength within a UV light wavelength range greater than or equal to 300 nm and less than or equal to 450 nm after cured is 30% or greater being used as the resin part 130 covering the optical fiber 11 as previously described, the entire optical fiber array 100 sufficiently transmits a UV light, and it is possible to transmit a sufficient UV light to the UV curable adhesive agent to easily fix it in a short time when fixing the optical fiber array 100 to the optical device 20.

It is preferable here that the at least one wavelength within the UV light wavelength range greater than or equal to 300 nm and less than or equal to 450 nm at which the light transmittance of the resin part 130 is 30% or greater correspond to the wavelength at which the light transmittance of the support member 110 is 30% or greater.

With a UV light having a wavelength at which both light transmittances of the resin part 130 and the support member 110 are 30% or greater being used to adhere and fix the optical fiber array 100 to the optical device 20, it is possible to easily fix the optical fiber array 100 to the optical device 20 in a short time.

Example

As examples of the embodiment described above and a comparative example, a mixture of a base material made of polycarbonate (thermoplastic resin, refractive index: 1.585) with spherical fillers of a quartz glass (refractive index: 1.570, average particle diameter: 20 μm) is pelletized, and the pellets are used to fabricate an optical fiber array (support member 110). That is, the difference between the refractive index of the base material and the refractive index of the filler is 0.015. The average molecular weight of the base material and the composite ratio of the filler are set as illustrated in Table 1. Then, the UV transmittance, the visible light transmittance, the linear expansion coefficient, and the size are measured, and the results of inspection of the material manufacturability and the moldability for the fabricated optical fiber array are illustrated in Table 1.

A measurement method based on JIS C 61300-3-27 (IEC 61300-3-27) was used for measurement of the size. Specifically, the optical fiber array that is a measuring object was placed on a stage, and the measuring object was irradiated with a visible light from a light source and captured by a CCD camera provided on the opposite side of the measuring object from the light source. A program for measurement binarizes the image captured by the CCD camera, recognizes the edge of the optical fiber array, and thereby acquires the size. In Table 1, size measurement with successful recognition is represented as a o-mark, and size measurement with failed recognition is represented as a x-mark.

TABLE 1

| | BASE MATERIAL MEAN MOLECULAR WEIGHT | FILLER COMPOSITE RATIO | | UV TRANSMITTANCE (WAVELENGTH 360 nm) | VISIBLE LIGHT TRANSMITTANCE (WAVELENGTH 380-780 nm) |
|---|---|---|---|---|---|
| | | wt % | VOLUME % | | |
| EXAMPLE 1 | 20000 | 70 | 50 | 46% | <57% |
| EXAMPLE 2 | 20000 | 60 | 40 | 51% | <63% |
| EXAMPLE 3 | 15000 | 60 | 40 | 51% | <63% |
| EXAMPLE 4 | 15000 | 50 | 30 | 57% | <70% |
| COMPARATIVE EXAMPLE 1 | 15000 | 40 | 20 | 62% | <76% |

| | MATERIAL MANUFACTURABILITY | LINEAR EXPANSION COEFFICIENT (ppm/° C.) | MOLDABILITY (FLUIDITY) | SIZE MEASUREMENT |
|---|---|---|---|---|
| EXAMPLE 1 | o | 31 | o | o |
| EXAMPLE 2 | o | 39 | o | o |
| EXAMPLE 3 | o | 39 | o | o |
| EXAMPLE 4 | o | 46 | o | o |
| COMPARATIVE EXAMPLE 1 | o | 53 | o | x |

As illustrated in Table 1, kneading and mixing when pellets are manufactured was stable and the manufacturability of the material was good in Examples 1 to 4 and Comparative example 1. Further, the fluidity of the material was good and moldability was good when the optical fiber array is molded in Examples 1 to 4 and Comparative example 1. When the optical fiber array was assembled and grinding process was performed thereon, no brakeage such as a crack occurred, and a sufficient strength was ensured. Since the UV light transmissivity of the fabricated optical fiber array is high, the optical fiber array was able to be adhered and fixed to the optical device easily in a short time by using the UV curable adhesive agent.

Since the visible light transmittance of the optical fiber array is 70% or less in Examples 1 to 4, the edge was able to be recognized when size measurement of the optical fiber array was performed, and the size was able to be accurately measured. In contrast, in Comparative example 1, the composite ratio of the filler is low, and the visible light transmittance is greater than 70%. As a result, the visible light for the size measurement was excessively transmitted, no edge was recognized, and it was difficult to measure an accurate size. It is therefore desirable that the composite ratio of the filler be greater than or equal to 30% in volume (50% in weight).

Furthermore, in Examples 1 to 3, with an increased composite ratio of the filler, the linear expansion coefficient is suppressed to 40 ppm/degrees Celsius or less. Thus, the difference in expansion coefficients at a fixing part of the optical fiber array to the optical device formed of a low linear expansion coefficient material is reduced, and this improves the reliability against a change in temperature. It is therefore more desirable that the composite ratio of the filler be greater than or equal to 40% in volume (60% in weight).

The present invention is not limited to the embodiments and examples described above, and modifications are possible within a scope not departing from the spirit of the present invention.

The invention claimed is:

1. An optical fiber array comprising:
an optical fiber; and
a support member that supports the optical fiber,
wherein the support member comprises a mixture material of a base material and a solid material made of a material different from the base material, in which the base material contains at least either of thermoplastic resin or thermosetting resin, and
wherein a light transmittance for at least one wavelength within a UV light wavelength range greater than or equal to 300 nm and less than or equal to 450 nm with respect to the support member having a thickness of 3 mm is 30% or greater, and an average light transmittance for a wavelength within a visible light wavelength range greater than or equal to 380 nm and less than or equal to 780 nm with respect to the support member having a thickness of 3 mm is 70% or less.

2. The optical fiber array according to claim 1, wherein the difference between a refractive index of the base material and a refractive index of the solid material is greater than or equal to 0.01 and less than or equal to 0.03.

3. The optical fiber array according to claim 1, wherein a volume of the solid material to a volume of the support member is greater than or equal to 40%, and a linear expansion coefficient of the mixture material is less than or equal to 40 ppm/degrees Celsius.

4. The optical fiber array according to claim 1, wherein the base material contains polycarbonate whose mean molecular weight is twenty thousand or greater.

5. The optical fiber array according to claim 1, wherein the solid material comprises a quartz glass.

6. The optical fiber array according to claim 1, wherein the solid material has a spherical shape in which an average particle diameter of the solid material is greater than or equal to 10 μm and less than or equal to 50 μm.

7. The optical fiber array according to claim 1, wherein the solid material comprises crushed fibers in which a fiber diameter is less than or equal to 50 μm and an average fiber length is less than or equal to 100 μm.

* * * * *